United States Patent
Castor et al.

[11] Patent Number: 5,853,841
[45] Date of Patent: Dec. 29, 1998

[54] FASTENER ASSEMBLY FOR A HIGH-STRENGTH CONNECTION TO A SUBSTRUCTURE

[75] Inventors: Jürgen Castor, Oberhausen; Harald Kollmann, Iserlohn; Knut Jansen, Mülheim/Ruhr, all of Germany

[73] Assignee: ITW Befestigungssysteme GmbH, Germany

[21] Appl. No.: 785,677

[22] Filed: Jan. 21, 1997

[30] Foreign Application Priority Data

Jan. 20, 1996 [DE] Germany .............. 296 00 973 U

[51] Int. Cl.⁶ ........................................ F16B 13/06
[52] U.S. Cl. .............. 428/99; 52/704; 403/268; 403/297; 405/259.6; 405/261; 411/82
[58] Field of Search ........................ 403/297, 268; 405/259, 261, 259.6; 411/82; 52/704; 428/99

[56] References Cited

U.S. PATENT DOCUMENTS

| | | | |
|---|---|---|---|
| 4,285,378 | 8/1981 | Wallace | 411/258 |
| 4,291,608 | 9/1981 | Lang | 411/16 |
| 4,475,329 | 10/1984 | Fischer | 52/704 |
| 4,478,544 | 10/1984 | Strand | 411/34 |

FOREIGN PATENT DOCUMENTS

| | | |
|---|---|---|
| 0 508 135 | 10/1992 | European Pat. Off. . |
| 0 639 240 | 2/1995 | European Pat. Off. . |
| 0 601 592 | 4/1996 | European Pat. Off. . |
| 1539999 | 8/1967 | France . |
| 1587880 | 5/1968 | France . |
| 2041804 | 4/1970 | France . |
| 2120970 | 12/1971 | France . |
| 2120971 | 12/1971 | France . |
| 2162085 | 11/1972 | France . |
| 2245871 | 7/1974 | France . |
| 2278981 | 7/1975 | France . |
| 2445805 | 8/1980 | France . |
| 2576069 | 1/1986 | France . |
| WO 91/18215 | 11/1991 | WIPO . |
| WO 96/25602 | 8/1996 | WIPO . |

*Primary Examiner*—Nasser Ahmad
*Attorney, Agent, or Firm*—Schwartz & Weinrieb

[57] ABSTRACT

A fastener for a high strength connection with a substructure with a straddling dowel, drilling cylinder or nail for insertion into a substructure material, for example, of concrete, rock, wood or the like, is disclosed. At least a portion of an outer surface of the fastener means is coated with a curable adhesive.

15 Claims, 1 Drawing Sheet

FASTENER ASSEMBLY FOR A HIGH-STRENGTH CONNECTION TO A SUBSTRUCTURE

FIELD OF THE INVENTION

The invention refers to fasteners for a high-strength connection to a substructure, and more specifically to straddling dowels to be connected with rock or concrete material, drilling cylinders for wooden structural members and nails.

BACKGROUND OF THE INVENTION

It is known to use dowels for the connection of parts, for example structural components to a substructure of concrete or hard rock. Prior to the placement of a dowel, a hole has to be drilled which is matched to the size of the dowel. Thereafter, the dowel is inserted up to the desired depth. Subsequently, the dowel is clamped within the drilled hole by turning a screw or a nut. In case of a heavy duty dowel a cone is drawn into an expansion sleeve by means of a threaded bolt which expands the sleeve into engagement with the wall of the hole. A plastic dowel is expanded at a longitudinally slotted portion by turning a threaded fastener into the dowel with anchoring tabs or the like being expanded or spreaded radially outwardly. If the dowel is loaded in the axial direction by a force engaging the bolt or the screw, an automatic spreading action takes place. Thus, the preload torque and the load capacity of the dowel are co-related. Hence, high preload torques are necessary in order to avoid an undesired slipping of the dowel. If the preload torque is too high, the substructure may be damaged, for example, by the breaking of the substructure. In this case the dowel fails to support a load. This performance can be observed in connection with soft construction material, for example, plaster, light concrete, aerated concrete, pumice or in connection with brick walls.

Drilling cylinders (or "cups") are used in furniture industries, in particular for the attachment of hinges or the support of shelves. The cylinder is forced or turned into a predrilled hole in the wooden material. For enhanced anchoring in the substructure, the cylinder can be provided with protrusions or a thread upon the circumference. This causes punctual or linear loads which allows a breaking away from the substructure in case of wooden compound materials frequently used.

Normally, nails have a substantially smooth surface whereby the pulling out strength is limited. This has to be considered when a nail connection is to be made by using a corresponding number of nails or the use of nails with a suitable configuration of the nail shank.

All of the aforementioned fasteners are subject to corrosion if made of metallic material, with such danger being dependent upon the nature of the substructure and other application conditions.

OBJECT OF THE INVENTION

It is an object of the invention to provide a fastener of the kind mentioned above which has an improved anchoring capability in the substructure and an improved corrosion resistance.

SUMMARY OF THE INVENTION

In accordance with the teachings of the present invention, the outer surface of the fastener according to the invention, for example, a straddling dowel, drilling cylinder or nail, respectively, is provided with an adhesive. This adhesive cures after the application of the fastener. Preferably, a microencapsulated adhesive is used which is activated by the pressure or shear forces generated by the application of the fastener, for example, by spreading, pressing, turning in, driving in or the like. The adhesive penetrates into adjacent portions of the substructure so that an intimate connection between the fastener and the substructure is provided, with the latter being contemporarily stabilized. This is a particular advantage with soft, brittle or easily breakable material as for example pumice, plaster, light concrete, aerated concrete, brick, wood or matchwood. An undesired slipping of the dowel, a breaking away of the drilling cylinder, or a tearing away of the nail is reliably avoided by the adhesion of the expandable area, the surface of the drilling cylinder or the shank of the nail, respectively, with the substructure material in the hole thereof. In the case of straddling dowels, a significant reduced pre-tension or pre-load is necessary. In the case of drilling cylinders, reduced outer cylindrical surfaces are necessary. In the case of nail connections, a smaller amount of nails is necessary requiring a smaller surface dimension. The fasteners also provide for a higher load capacity with soft materials. If the fasteners are made of metal, the coating effects corrosion protection. Furthermore, the coating facilitates the pressing or driving in of the fastening means in that it has a similar performance as a lubrication means. The invention covers all fastener means beyond straddling dowels, drilling cylinders or nails where the application develops pressure or shearing forces between the fastener and the substructure.

The coating may comprise a microencapsulated adhesive which is activated by the pressure and the shearing forces occurring upon formation of a thread and which cures after insertion. The coating may include an adhesive which is microencapsulated by means of a polymeric film and is embedded in a reactive bonding system. Such a coating remains inactive after being applied to the fastener until the capsules burst upon pressing, turning or driving in of the fastener whereafter the adhesive is cured. Such a microencapsulated adhesive is available under the trade name "Scotch Grip"2353 and 2451 of the 3M company.

An alternative coating may comprise a liquid synthetic material and a curing agent which are separately microencapsulated by means of a polymeric film and embedded in a carrier varnish. The coating of a fastener means with such a system is dry, has gripping properties and is ready for use at any time. The microcapsules are destroyed by pressure or shear stress upon insertion, turning in or driving in, of the fastener with the liquid synthetic material and the curing agent being exposed and intermixed so that a chemical reaction occurs, that is, polymerization, and the adhesive cures. A corresponding microencapsulated adhesive is available under the trade name "OT Precode 30+80" of Omni-Technik.

The extension of the coating can be limited to the portions or parts of the fastener means which are expanded or pressed or driven into the substructure.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
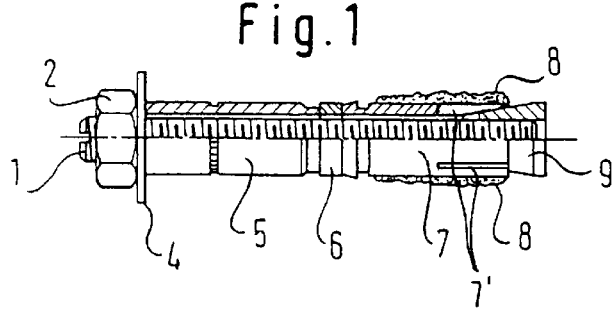
FIG. 1 is a longitudinal section view, as shown in the upper half and a side elevational view shown in the lower half of a heavy duty anchor including a nut and an adhesive coating.
Figure 2:
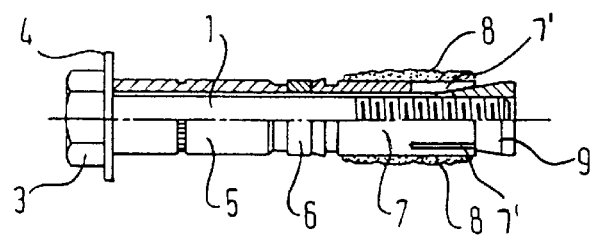
FIG. 2 is a longitudinal sectional view shown in the upper half and a side elevational view shown in the lower half of a heavy duty dowel with a screw and an adhesive coating.

As shown in FIGS. 1 and 2, the heavy duty anchors each have a threaded bolt 1 which according to FIG. 1 bears a nut 2 and according to FIG. 2 a head 3. A washer 4 is placed on the threaded bolt 1 adjacent to nut 2 or to bolt head 3, respectively. Both threaded bolts 1 carry a spacer sleeve 5. Adjacent to spacer sleeve 5 a pressing ring 6 is placed on the threaded bolt 1.

Both threaded bolts 1 carry a spreader or expansion sleeve 7 adjacent to the pressing ring 6. In both cases a cylindrical sleeve is provided having slots 7' at one end portion thereof which facilitates radial expansion. The expansion sleeve 7 is provided with a coating 8 of a microencapsulated adhesive upon the outer circumference.

At one end of the threaded bolt an expansion cone 9 is threadedly adapted to be pulled into the adjacent expansion sleeve 7 in order to perform an expansion thereof.

For the connection of two parts the heavy duty dowels are inserted into aligned drilled bores of both parts until washer 4 engages the surface of the part to be attached. The expansion sleeve 7 is then accommodated by the substructure. Thereafter, expansion sleeve 7 is spread or expanded by pulling the spreading cone 9 into the expansion sleeve 7 by turning nut 7 or head 3 of the bolt, upon expansion of sleeve 7 the microencapsulated adhesive of the coating 8 is activated and penetrates into adjacent areas of the substructure and effects a particularly secure anchoring after curing.

Figure 3:
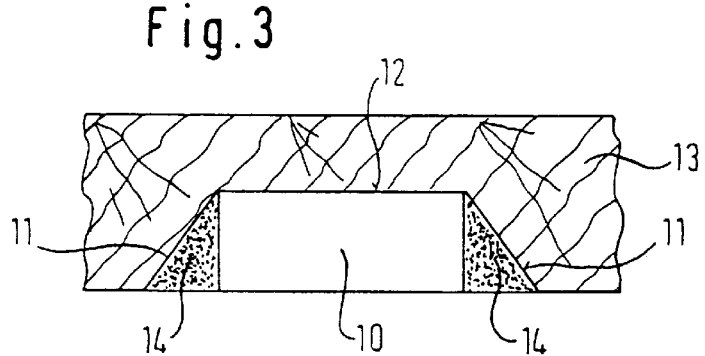
FIG. 3 is a cross-sectional view of a drilling cylinder with an adhesive coating in a substructure of wood.

According to FIG. 3 a drilling cylinder 10 of cast metal has a substantially cylindrical shape comprising circumferential protrusions 11 at the outer surface. Cylinder 10 is pressed into a bore 12 of a wooden part 13, with the protrusions 11 penetrating the wall of the bore 12. A coating 14 of microencapsulated adhesive provided on the protrusions 11 or the outer surface of the cylinder 10, respectively, penetrates adjacent portions of the wooden part 13 and is cured. Larger portions of the wooden part 13 are thus involved in the connection as compared with a mere mechanical anchoring. Thus, the pulling out strength is significantly improved.

Figure 4:
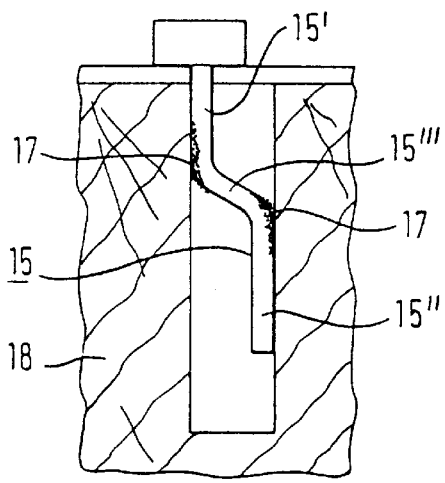
FIG. 4 is a cross-sectional view of a striker nail with an adhesive coating in an anchoring substructure.
Figure 5:
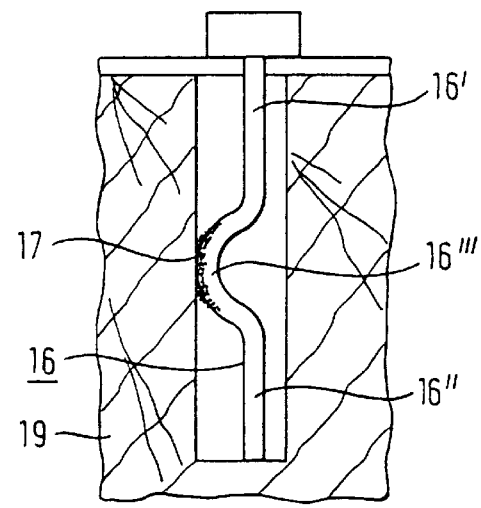
FIG. 5 is a cross-sectional view of another striker nail with an adhesive coating in an anchoring substructure.

FIGS. 4 and 5 show so-called Striker nails 15 and 16 having shanks of metal wire with differently bent shank portions. In the embodiment of FIG. 4 the nail 15 has two parallel offset shank portions 15' and 15", with a bent portion 15''' therebetween. In the embodiment of FIG. 5 crank portions 16' and 16" are in line, with a shank portion 16 therebetween. Opposed surface portions of shank portions 15', 15" and the convex surface of crank portion 16''', respectively, are provided with a coating 17 of a microencapsulated adhesive. At these portions, particularly high pressures and shear forces occur upon driving in of the nails which serve to activate the adhesive. After the curing has taken place, the connection of the nails 15 or 16 with the substructure 18, 19, respectively, is significantly improved.

Obviously, many modifications and variations of the present invention are possible in light of the above teachings. It is therefore to be understood that within the scope of the appended claims, the present invention may be practiced otherwise than as specifically described herein.

We claim:

1. An expandible dowel for insertion into a hole drilled within a substructure, comprising:

a body member;

a radially expandible member disposed upon said body member;

means operatively connected to said body member and movable relative to said body member and said radially expandible member for causing said radially expandible member to be radially expanded into contact with interior wall portions of a substructure, which define a hole into which said expandible dowel is to be inserted, when said means is moved relative to said body member and said radially expandible member; and coating means comprising a curable adhesive disposed upon an outer peripheral surface portion of said radially expandible member for adhesively bonding said expandible dowel within a hole defined within a substructure into which said expandible dowel is to be inserted.

2. An expandible dowel as set forth in claim 1, wherein:

said body member comprises a threaded bolt;

said radially expandible member comprises an axially split sleeve member;

said means for causing said radial expansion of said radially expandible split sleeve member comprises a conical member threadedly connected to said threaded bolt so as to be axially drawn into said radially expandible split sleeve member when said threaded bolt is rotated about its axis and thereby cause said radial expansion of said radially expandible split sleeve member; and said curable adhesive is disposed upon an external peripheral surface portion of said radially expandible split sleeve member.

3. An expandible dowel as set forth in claim 2, wherein: said threaded bolt comprises a headed threaded bolt.

4. An expandible dowel as set forth in claim 2, wherein: said threaded bolt comprises a threaded rod; and a nut is threadedly engaged upon an end of said threaded rod disposed opposite an end upon which said conical member is threadedly engaged.

5. An expandible dowel as set forth in claim 1, wherein:

said coating means comprises a plurality of rupturable capsules within which said curable adhesive is microencapsulated.

6. An expandible dowel as set forth in claim 1, wherein:

said coating means comprises a curable adhesive which is microencapsulated by means of a polymeric film and embedded within a reactive bonding system.

7. An expandible dowel as set forth in claim 1, wherein:

said coating means comprises a curable adhesive which comprises a liquid synthetic material and a curing agent which are microencapsulated separately by means of a polymeric film and embedded within a varnish carrier.

8. The expandible dowel as set forth in claim 1, wherein:

said body member comprises a threaded shaft;

said means for causing said radially expandible member to be radially expanded comprises an expansion cone threadedly engaged with said threaded shaft and axially movable along said threaded shaft as said threaded shaft is rotated relative to said expansion cone; and said radially expandible member comprises an axially slotted expansion sleeve.

9. An expandible dowel for insertion into a hole drilled within a substructure, comprising:

a threaded shaft member having a longitudinal axis;

a radially expandible sleeve member disposed upon said body member;

an expansion cone member threadedly engaged with said threaded shaft member, and having a portion thereof interposed between said threaded shaft member and said radially expandible sleeve member, so as to undergo axial movement relative to said threaded shaft member, and thereby cause radially outward expansion of said radially expandible sleeve member into contact with interior wall portions of a substructure which define a hole into which said expandible dowel is to be inserted, when said threaded shaft member is rotated relative to said expansion cone; and coating means comprising a curable adhesive disposed upon an outer peripheral surface portion of said radially expandible sleeve member for adhesively bonding said expandible dowel within a hole, defined within a substructure into which said expandible dowel is to be inserted, when said expandible sleeve member is expanded radially outwardly into contact with the interior wall portions of the substructure by said expansion cone member.

10. The expandible dowel as set forth in claim 9, wherein:

said radially expandible sleeve member comprises an axially slotted sleeve member.

11. The expandible dowel as set forth in claim 9, wherein:

said threaded shaft member comprises a headed threaded bolt.

12. The expandible dowel as set forth in claim 9, wherein:

said threaded shaft member comprises a threaded rod; and a nut is threadedly engaged upon an end of said threaded rod which is disposed opposite an end upon which said expansion cone member is threadedly engaged.

13. The expandible dowel as set forth in claim 9, wherein:

said coating means comprises a plurality of rupturable capsules within which said curable adhesive is microencapsulated.

14. The expandible dowel as set forth in claim 9, wherein:

said coating means comprises a curable adhesive which is microencapsulated by means of a polymeric film and embedded within a reactive bonding system.

15. The expandible dowel as set forth in claim 9, wherein:

said coating means comprises a curable adhesive which comprises a liquid synthetic material and a curing agent which are microencapsulated separately by means of a polymeric film and embedded within a varnish carrier.

\* \* \* \* \*